US006493003B1

(12) United States Patent
Martinez

(10) Patent No.: US 6,493,003 B1
(45) Date of Patent: Dec. 10, 2002

(54) LINKING GRAPHICAL USER INTERFACES

(75) Inventor: Anthony Edward Martinez, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/240,016

(22) Filed: Jan. 29, 1999

(51) Int. Cl.[7] ................................. G06F 3/00
(52) U.S. Cl. .................... 345/781; 345/733; 345/966; 345/967
(58) Field of Search ............... 345/331, 332, 345/340, 329, 348, 349, 967, 966, 969, 339, 346, 356, 751, 759, 781, 733, 835, 839, 764, 709; 709/328, 329, 310, 313

(56) References Cited

U.S. PATENT DOCUMENTS

| | | | | |
|---|---|---|---|---|
| 5,481,741 A | * | 1/1996 | McKaskle et al. | 345/522 |
| 5,760,767 A | * | 6/1998 | Shore et al. | 345/328 |
| 5,990,887 A | * | 11/1999 | Redpath et al. | 345/330 |
| 6,081,265 A | * | 6/2000 | Nakayama et al. | 345/329 |

OTHER PUBLICATIONS

Thomas Chester and Richard H. Alden, Mastering Excel 97, 1997, SYBEX Inc, Fourth Edition, pp. 13–16, 31–36, 69, 121–123, 166–167, 174–176, 252–254, 719–731.*

* cited by examiner

*Primary Examiner*—John Cabeca
*Assistant Examiner*—Kiev D. Vu
(74) *Attorney, Agent, or Firm*—David A. Mims, Jr.; Robert V. Wilder

(57) ABSTRACT

A method and implementing computer system is provided in which a user program-linking interface is presented on a computer screen to enable a user to select an input or source program, as well as one of several available functional operators. The linking program is effective to receive data from the input program, perform a selected functional operation on the data as may be selected by a user, and deliver the resulting information in a manner chosen by the user. In one exemplary embodiment, the resulting information is delivered to a selected output or target program which may be coupled to the linking program. In another example, the linking program is effective to provide a display window to show the results of the functional operation performed on the source program as selected by the user.

25 Claims, 12 Drawing Sheets

LINKING GRAPHICAL USER INTERFACES

FIELD OF THE INVENTION

The present invention relates generally to information processing systems and more particularly to a methodology and implementation for enabling a user interface and data flow between different applications in a computer system.

BACKGROUND OF THE INVENTION

Current computer workstations and PCs have the ability to have a plurality of programs open at a given time, and to run any selected one of them by merely "pointing and clicking" a pointer on a screen to an icon of the desired program. Such programs include browser programs, text processing programs, and "chat" programs among others. Text processing programs are able to receive input from a user, process words and text in accordance with the user input and selectively provide an output such as a printed document or saved file at the direction of the user. So called "chat" or "instant messaging" programs are used to allow many users to share a common session on a network, such as the Internet. Inputs from the participants are "posted" in a viewable area on each user's screen, and the other participants are able to respond. All user inputs are presented on the screens of all of the participants. Browser programs are run to enable users to access the resources of the Internet or World Wide Web. By using a browser program, a user is able to connect to any of a great number of available web sites for any of any purposes, including conducting research and/or business transactions. Users are also able to download other programs from web sites and run the programs on the user's terminal.

In all of these programs, a user may work and perform program functions only within the framework of the individual programs. Typically, the programs are user-friendly and menu-driven, and the user is limited to functions specified in the menus which may be presented on the user's display screen. For example, in a word or text processing program, a user may input and manipulate text in a document but would not be able to send that text to another terminal without using another program such as an email program included within a browser program. Even in working with several documents within one word processing program, if it is desired to transfer text between the programs, the user must cut-and-paste within the framework of the word processing menu system. Users have been unable to reap synergistic results which may be available from combining the functions and operations of the several programs which may be open at any given time on a user's terminal.

Thus there is a need for an improved methodology and implementing system which enables a more advantageous use of available programs on a user terminal by enabling a user to combine the various functions of the programs and providing for selective operational and functional relationships between programs during user terminal sessions.

SUMMARY OF THE INVENTION

A method and implementing computer system is provided in which a user program-linking interface is presented on a computer screen to enable a user to select an input or source program, as well as one of several available functional operators. The linking program is effective to receive data from the input program, perform a selected functional operation on the data as may be selected by a user, and deliver the resulting information in a manner chosen by the user. In one exemplary embodiment, the resulting information is delivered to a selected output or target program which may be coupled to the linking program. In another example, the linking program is effective to provide a display window to show the results of the functional operation performed on the source program as selected by the user.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented within a typical computer system 101 which may include a workstation or personal computer. In general, an implementing computer system may include a plurality of processors in a multi-bus system in a network of similar systems. However, since the workstation or computer system 101 implementing the present invention in an exemplary embodiment, is generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention.

Figure 1:
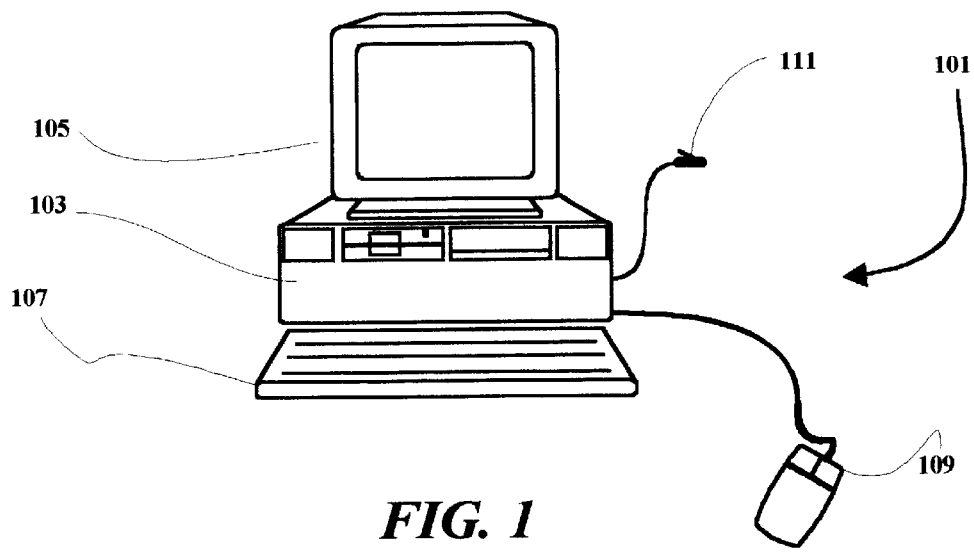
FIG. 1 is a diagram of a computer system in which the present invention may be implemented.

In FIG. 1, the computer system includes an electronics enclosure 103 which is typically arranged for housing one or more CPUs (central processing units) along with other component devices and subsystems of the computer system 101. The computer system 101 also includes a monitor unit 105, a keyboard 107 and a mouse or pointing device 109, which are all interconnected within the illustrated computer system. The present invention may also be implemented in a laptop computer having a display device other than a CRT (cathode ray tube). Also shown in FIG. 1 is a connector 111 which is arranged for connecting a modem within the computer system to a communication line such as a telephone line in the present example. The present invention may also be implemented in a cellular system without the connector 111.

Figure 2:
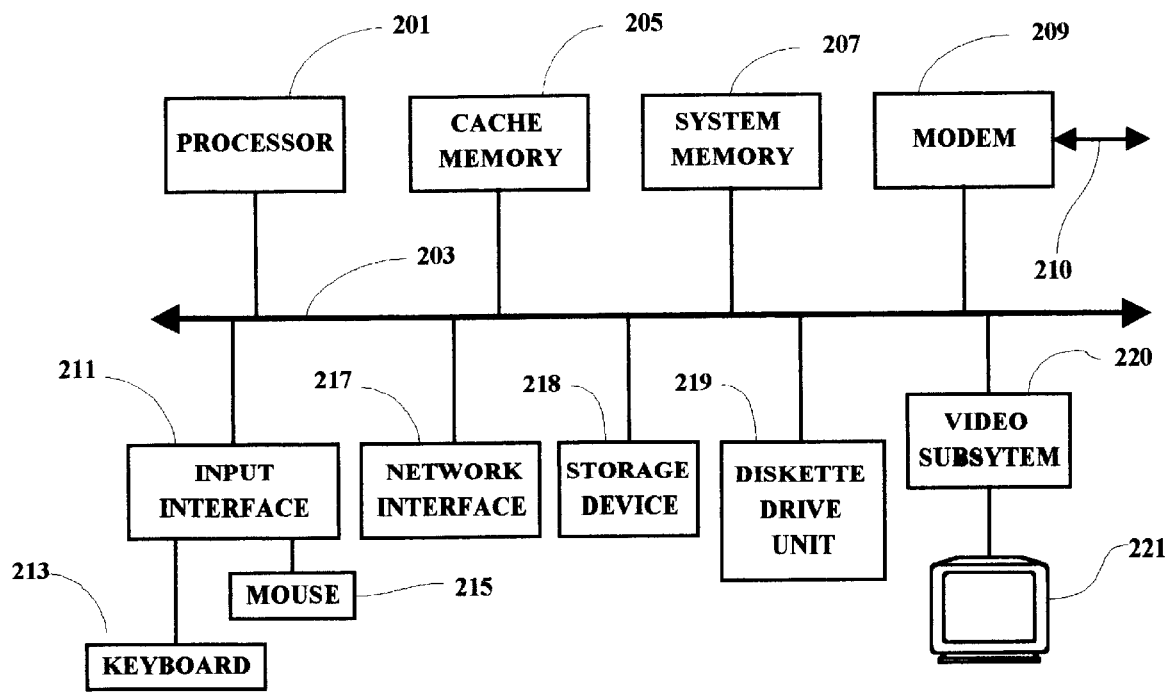
FIG. 2 is a simplified schematic diagram showing selected components and subsystems of the computer system illustrated in FIG. 1.

Several of the major components of the system 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit 207 are also connected to the bus 203. A modem 209 is arranged for connection 210 to a communication line, such as a telephone line, through a connector 111 (FIG. 1). The modem 209, in the present example, selectively enables the computer system 101 to establish a communication link and initiate communication with another computer system, or network or database server.

The system bus 203 is also connected through an input interface circuit 211 to a keyboard 213 and a mouse or pointing device 215. The bus 203 is also coupled to a separate network subsystem interface 217 and a diskette drive unit 219. The exemplary computer system may also include a CD drive in addition to the diskette drive 219. A video subsystem 220, which may include a graphics subsystem, is connected to a display device 221. As hereinbefore noted, the display device may be of any known technology for presenting display screens to a user. A storage device 218, such as a hard drive unit, is also coupled to the bus 203. The diskette/CD drive unit 219 provides a means by which individual diskette or CD programs may be loaded on to the hard drive, or accessed directly, for selective execution by the computer system 101. As is well known, program diskettes containing application programs represented by magnetic indicia on the diskette, or programs in system memory, or acquired through a local network or through the world wide web may be read to provide program signals. Such program signals are selectively effective to cause the computer system to present displays on the screen of a display device and respond to user inputs in accordance with the functional flow of the application program being executed.

In running an Internet access program or browser program on the computer system 101, the access program is typically stored in the storage device 218 and either selectively or automatically, partially or totally, loaded into the system memory 207 when the system is initially powered-on, or at a later time if so desired by a user. The browser is selectively operable to access and execute a site selection program either directly from a diskette in the diskette drive unit 219 or directly from a copy of the site selection program stored on the hard drive unit 218. As a program is running, either a portion of the program or the entire program may be loaded into the system memory 207 and/or the system cache memory 205. Depending on specific program or system design, the system may store any information accessed from a database in the storage unit 218, the cache memory 205, the system memory 207 or directly from a diskette loaded into the diskette drive 219. Assuming a user has started-up the system, and is actively running a browser program for example, from memory, a series of screens will be displayed to the user on the display device 221. Each screen typically has one or more selections for the user to make in navigating through the program. In general, a user will make selections from a display screen using the keyboard 213 or the mouse or pointer device 215. In an Internet browser program, the selections made by the user will determine "where" the user "goes", i.e. to what "site" or "webpage", and also, in some cases, the communications link or the path taken to get to the site selected.

Figure 3:
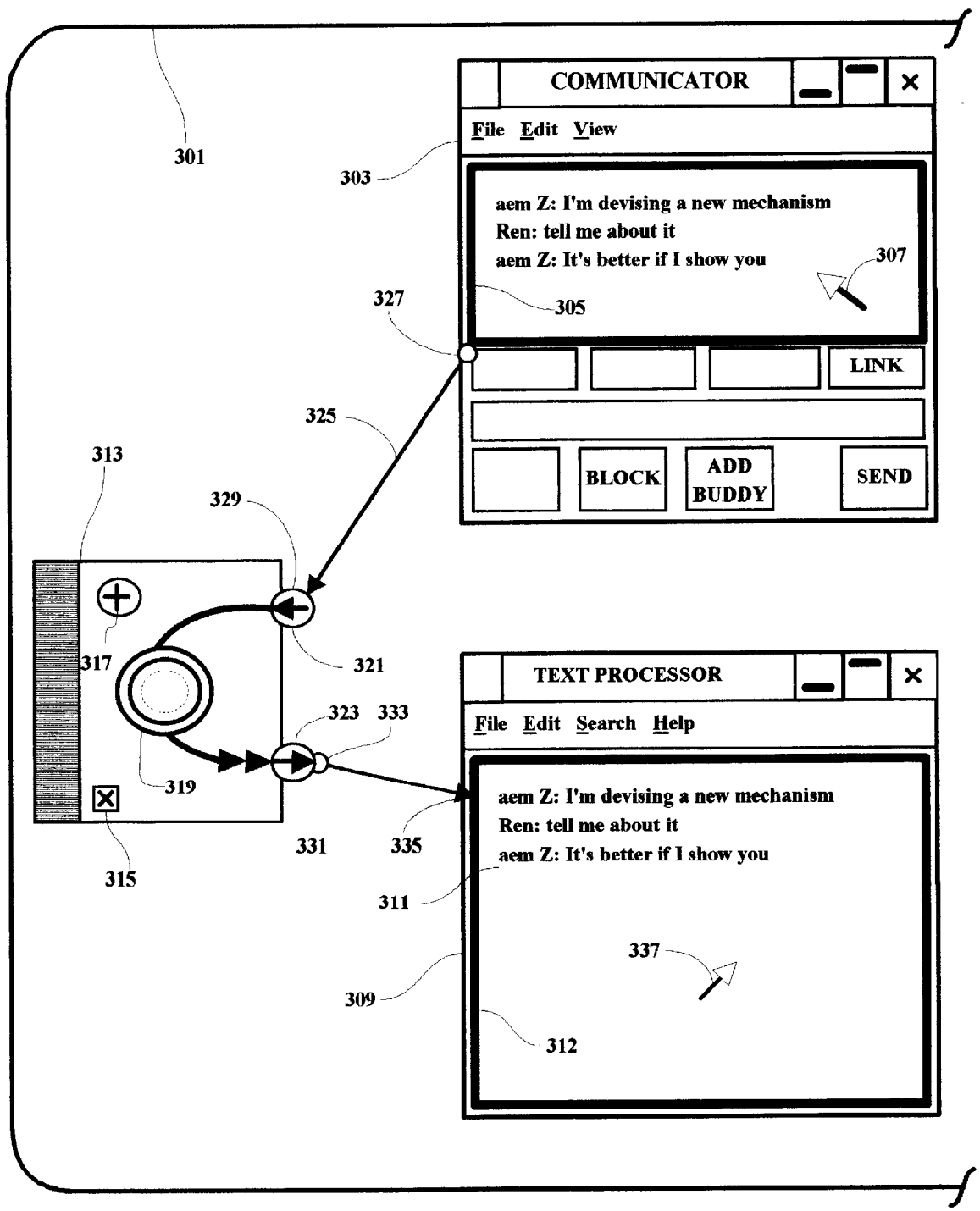
FIG. 3 is an illustration of an exemplary display screen showing several program windows useful in explaining the present invention.

In FIG. 3, there is shown an exemplary computer display screen 301 on which three windows 303, 309 and 313, are presented. Each window represents a program which has been opened and is running on the computer system display screen 301. The first program 303 is a communicator or messenger program which allows two or more users to communicate with each other through a network connection such as the Internet. The second program illustrated is a text or word processor program which is used to input, manipulate and output text. As is well known, output from the text processor may be saved to a file or printed at a printer station. Generally, however, output from the text processor may not be transmitted to another user in a network connection for example without the aid of another program such as an email or fax program running on the computer system. FIG. 3 also shows a third window 313 which represents a linking program icon or image in accordance with the present invention.

The linking program icon 313 represents a linking program which is the subject of the present invention. The exemplary application illustrated in FIG. 3 is effective for automatically copying text from a messenger or communicator application 303 to a word or text processor program 309. In the example, both programs are independent and are linked together using the linking program 313. In the example the user has the messenger program 303 and the text processor program 309 up and running on the user's computer workstation. To set up the linking function, a user first selects a "copying" function for example (explained in connection with FIG. 9), and then the user points to and clicks on a linking "input" indicium 321 with a mouse pointer 307 which is controlled by a mouse input device. The user then drags the pointer 307 to an input field 305 in the application 303 which is to be used to provide input to the linking program 313. When the pointer is in the vicinity of an input field such as the text area 305 of the communicator program 303, the user releases the mouse button and the selected field is highlighted to confirm that it has been selected and is operational to provide data input to the linking program 313. In the present example, and throughout all of the Figures herein presented, the selected fields, both input and output fields, are designated by having the field border emboldened. The selected field may be represented by any of many possible ways of distinguishing one field from the others in a window such as by presenting the selected field in a different color. Also, in an exemplary embodiment, when the user clicks on the input indicium 321 and drags the pointer 307 to the input field 305, an input arrow 325 is extended from the indicium 321 to the selected program 303 and the input arrow 325 will remain on the display screen until the linking program is closed down. The linking arrow includes a tail portion 327 for indicating where, i.e. which field, the input is coming from, and an arrowhead portion 329 for indicating to which program or field the data or input information is going. For example, the input arrow 325 is shown to be positioned on the selected input field border 305 in FIG. 3. Alternate arrangements are also possible to provide an indication of which fields are being used for input and/or output during an operation of the linking program 313.

Next, in a similar manner, the user selects the program which will be receiving the information which is processed by the linking program 313. In the example, the user points to and clicks on a linking output indicium 323 and, while holding down the mouse button, drags the pointer 337 to an output field such as a text field 311 of the processor program 309. When the mouse button is released, the text field border 312 is highlighted, and an output arrow 331 is presented on the screen. The output arrow 331 includes a tail portion 333 for indicating the source of input to the program 309 as well as an arrowhead portion 335 for indicating the target of the data from the linking program 313.

The linking program icon 313 includes an activation button 317 which can be used as an "on-off" button for the selected copying function. Also illustrated is a "shut-down" button 315 which may be used to shut down the linking program. In the present example, the linking program will "lose" or not store the selections made in the FIG. 3 example when the program is shut down although other shut down options are also available and consistent with the present invention. When the linking program function ("copy" in the FIG. 3 example) has been selected by pointing and clicking on a function button 319 (as hereinafter explained in FIG. 9), and at least one each source arrow 325 and target arrow 331 have been activated as hereinbefore explained, the linking program will be effective to copy the text from the messenger program 303 and input the text to the word processor program 309 from which many other functions can be applied.

Figure 4:
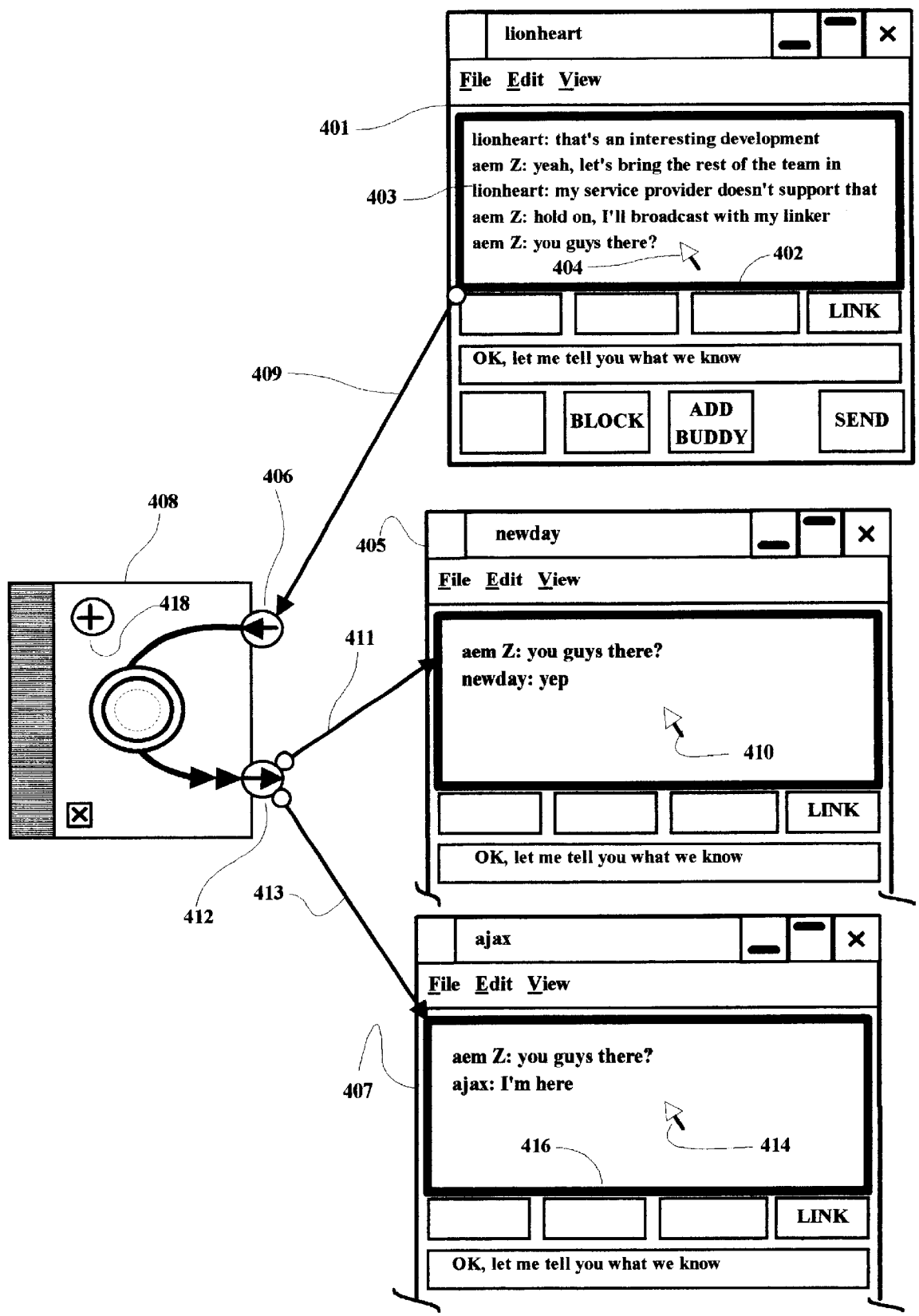
FIG. 4 is illustration of an exemplary screen display showing a broadcast application for the present invention.

Another exemplary embodiment is illustrated in FIG. 4 where there is shown a "broadcast" mode implementation of the present invention. As shown, three messenger program windows 401, 405 and 407 are illustrated for three users in a common communication session, in addition to a linking program icon 408. After a user selects a broadcast "mode", the user then points to and drags the pointer 404 from the linking program input indicium 406 to, and selects, the text field 403 of the master program 401 which establishes the arrow 409 and the highlighted field border 402. Next, the user clicks on and drags the pointer 410 from the output indicium 412 to the text field of the second user program 405 and establishes the arrow 411. Then the user completes the set up by dragging the pointer 414 from the output indicium 412 to the text field of the third messenger program 407 thereby establishing the arrow 413 and the highlighted border 416. When all of the above preparations have been accomplished, the user may then activate the linking program by clicking the "on-off" toggle button 418 at which time the linking program will be effective to broadcast from the master program 401 to the secondary messenger programs 405 and 407 as shown. Alternatively, the linking program may begin to function automatically as soon as at least one arrow is connected to an input field and to an output field. The information flow may be selectively temporarily terminated by clicking the button 418 to turn off the linking flow of information between the connected or linked programs, and then later resumed by a subsequent clicking on the button 418. The linking program may be shut down as hereinbefore explained in connection with FIG. 3.

Figure 5:
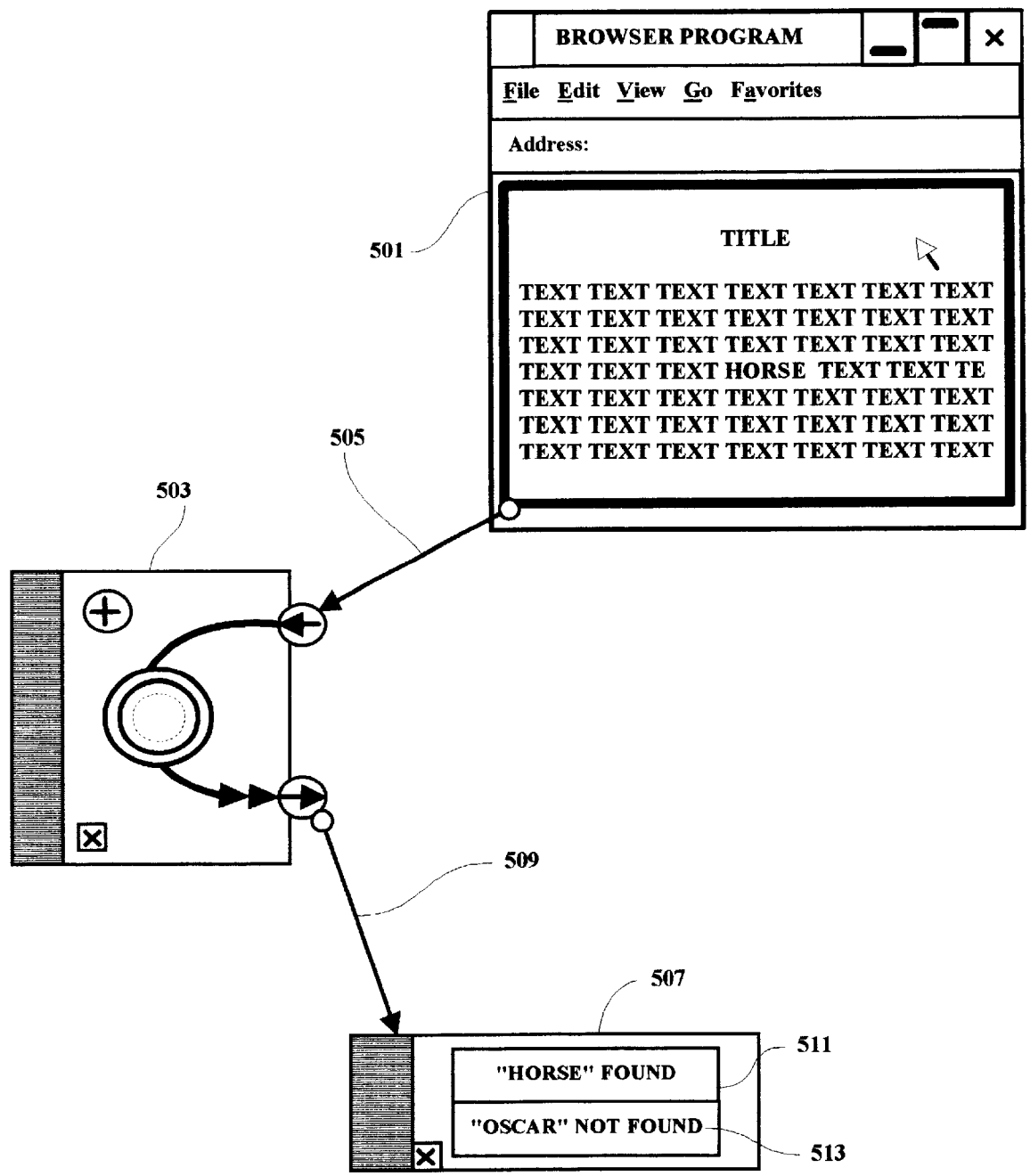
FIG. 5 is illustration of an exemplary screen display showing an independent functional operation application for the present invention.

In FIG. 5, the linking program 503 is operated to conduct selected word searches of documentation being displayed in a browser program 501 accessed from the Internet. As illustrated, the input arrow 505 has been established and the text field of the Internet program has been highlighted as explained in connection with previous Figures. The linking program 503 is shown running in a "custom" mode in which the linking program is able to search presented documents and indicate when a selected word or phrase has been detected as being present in the displayed screen. In the example, when the custom mode is activated, the output window 507 and linking indicium 509 appear to indicate the results of the search function. The linking program in FIG. 5 has been programmed to search for the words "horse" and "oscar". As shown in the displayed text, the word "horse" has been found to be present in the text and such is indicated in the results box 511. At the same time the word "oscar" has not been found as shown in the results box 513. The example illustrated in FIG. 5 may also be expanded to implement a "triggering" function by which input information is screened for the occurrence of content which is selected by a user, and the occurrence of that content may "trigger" a display or other action as may be programmed by the user. Another example would be an automatic "saving" of copied content after a selectable amount of data has been copied.

Figure 6:
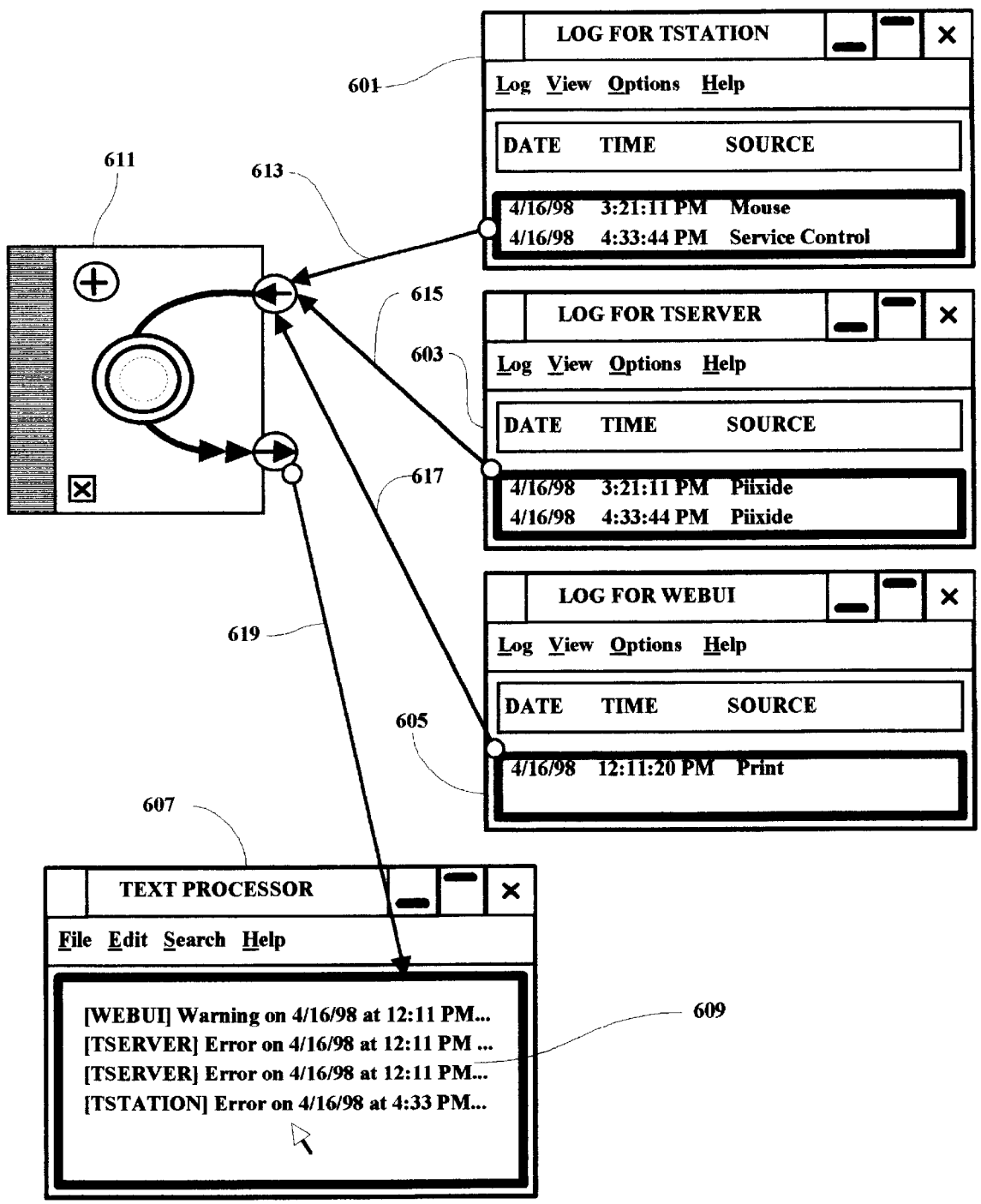
FIG. 6 is illustration of an exemplary screen display showing a combining functional operation application for the present invention.

In FIG. 6, there is shown an example of a "collection" or "consolidating" function for the linking program. As illustrated, the linking program 611 is consolidating the outputs from several error logs 601, 603 and 605 into a text field 609 of a single notepad file 607. The configuration is accomplished in a manner similar to the set-up for previous drawings. The input fields are selected and highlighted and the input arrows 613, 615 and 617 are also established. The text field of the output file 607 is then selected and the arrow 619 is displayed. The linking program is then initiated to operate to consolidate the individual logs into one file.

Figure 7:
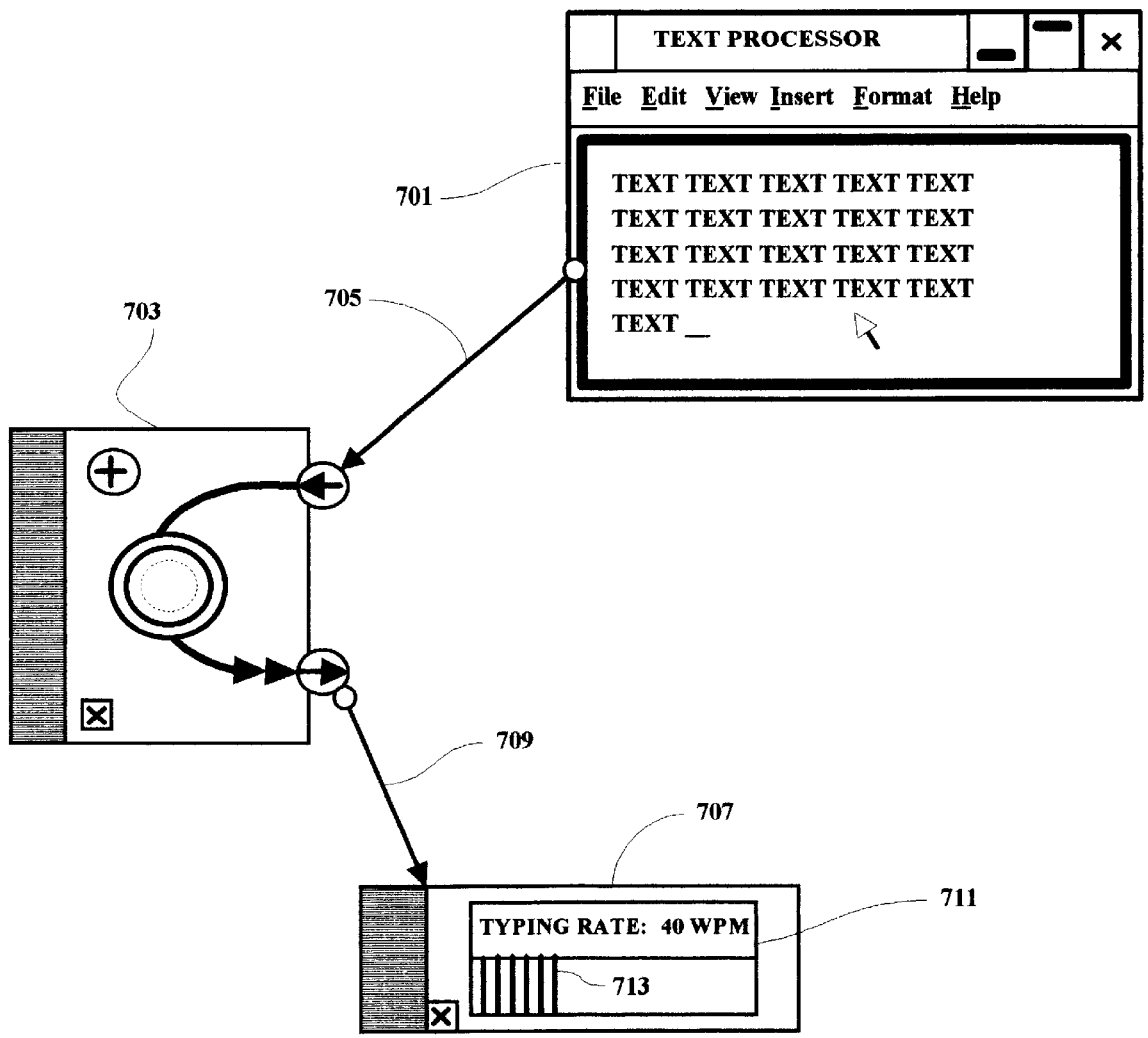
FIG. 7 is another example of an independent functional operation application for the present invention.

In FIG. 7, the linking program 703 is monitoring the input stream 705 from a text processor 701 and providing an output 709 to a visual display 707. In the example, the display includes a text 711 indicating the number of words-per-minute being typed into the text program 701, as well as a graphical indication 713 of the same information.

Figure 8:
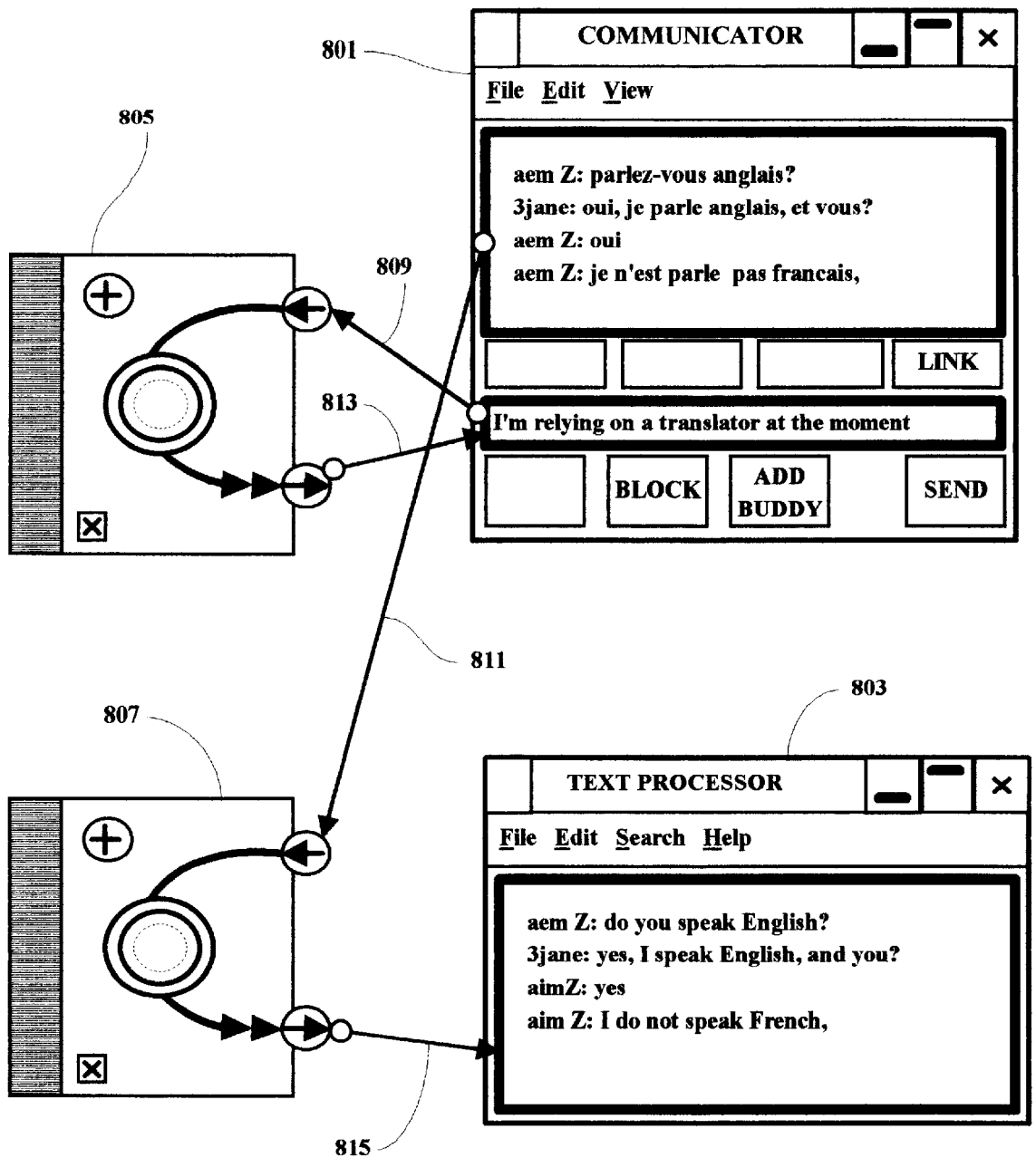
FIG. 8 is an example of a language translation messaging function which may be implemented using the present invention.

In FIG. 8, two linking program interfaces 805 and 807 are illustrated, together with a communicator icon or interface 801 and a text processor icon or interface 803. The programs are coupled as illustrated by arrows 809, 811, 813 and 815. Each of the linking programs is set-up with a "custom" filter, and the configuration is effective for translating back and forth from French to English, to enable a conversation between two individuals speaking different languages. The translation software is handled by a custom filter selected by a user during the initial set-up of the linking program.

Figure 9:
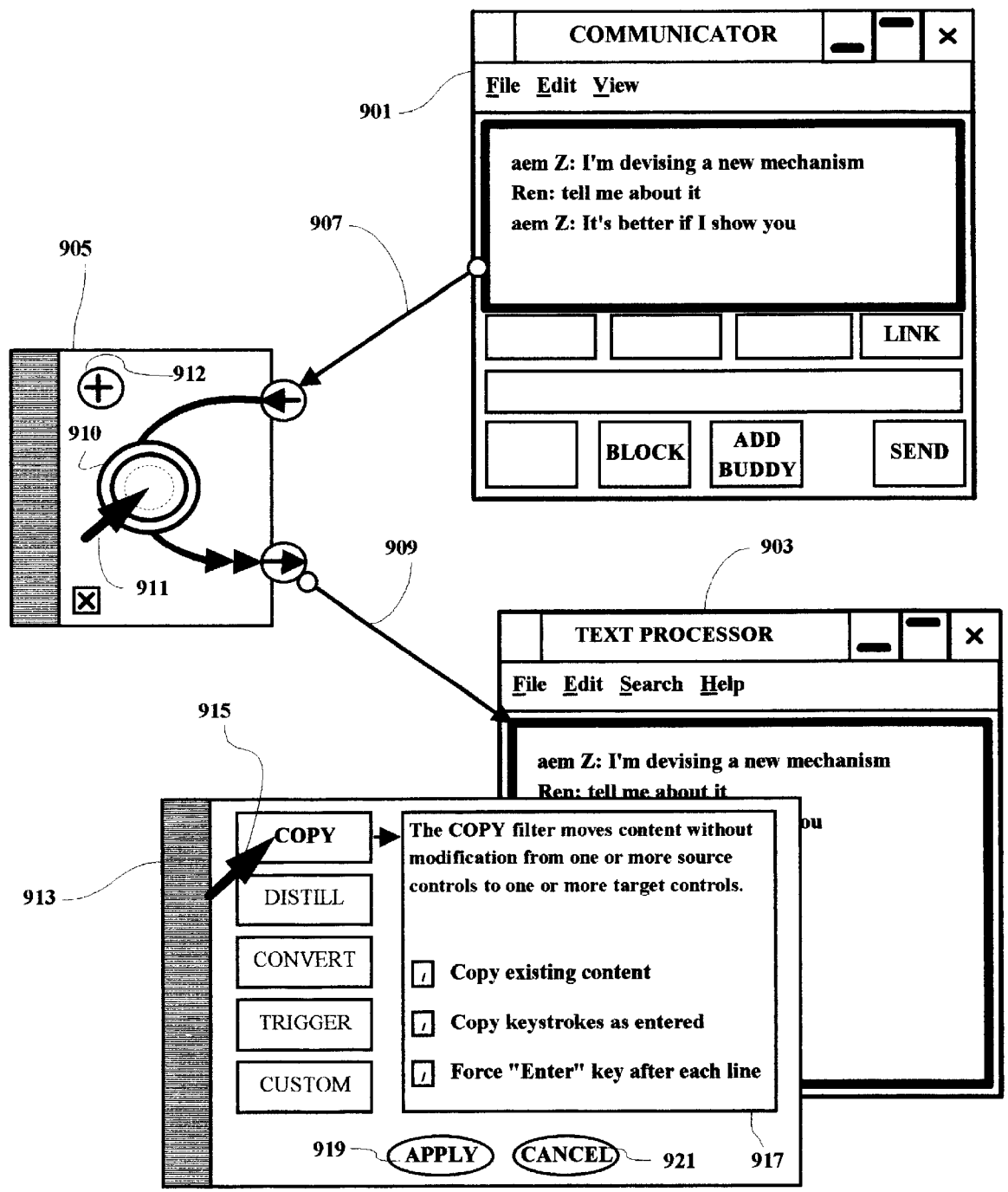
FIG. 9 is an exemplary screen display showing a menu routine to select one of several functional operations for the linking program.

FIG. 9 illustrates an exemplary operation during an initial linking program set-up by which a user selects the function or filter to be implemented by the linking program. The specifics of the graphics and detailed implementation may vary widely but an example of the basic flow is illustrated in the drawing. In the example shown, a communicator program 901 is connected 907 to a linking program 905, and the linking program is arranged to perform a function on the input 907 to provide an output 909 to a text processing program 903. The selection of the function to be performed by the linking program 905 is accomplished when the user points the pointer 911 to the "function select" area 910 and clicks the mouse button. That action will make the selection window, or filter properties window 913, appear on the user's screen. The user will then point to a selected one of the several available function from which to choose. In the example, the user points 915 to the "COPY" function, and the illustrated explanation and further selection information appears 917. Such information in the example includes specific selections for particulars of the copying function. Also illustrated in the selection window are areas which may be selected to "APPLY" 919 the selections after they have been made, or to "CANCEL" 921 the operation. After selecting the particulars of the "COPY" operation, the user will point to and click on "APPLY", and then click on the start button 912 to initiate the copy function during which the text being typed in the communicator program 901 is copied to the text processor program 903. The sequence of selecting the input field and the output field and the linking program function may be altered but all three inputs will be required before the operation is commenced, although a default function may be implemented.

The "CUSTOM" function in the present example, may include any known state-of-the-art function or program which may be implemented in a computer system to receive an input, perform a function on the input and send the result to the output. In the present example, the "COPY" function is used to move content from input to output with no change. The "DISTILL" function is used to examine input and send selected content to output or a special linking program display. The "CONVERT" function transforms input from one format to another format and sends it to the output. The "TRIGGER" function reacts to specific input content by performing an action which may or may not include an associated display.

Figure 10:
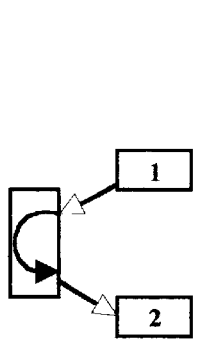
FIG. 10 is a schematic drawing showing program relationships for a "route" operation of the linking program.
Figure 11:
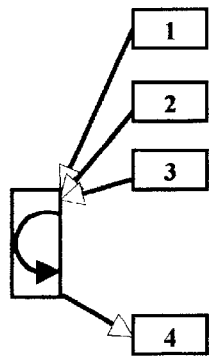
FIG. 11 is a schematic drawing showing program relationships for a "collect" operation of the linking program.
Figure 12:
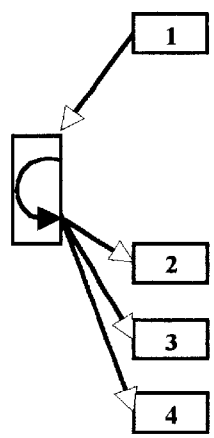
FIG. 12 is a schematic drawing showing program relationships for a "broadcast" operation of the linking program.
Figure 13:
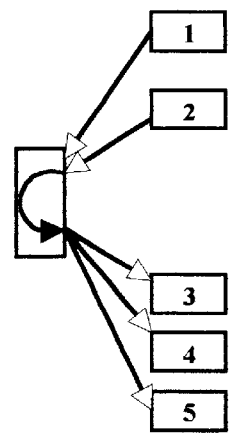
FIG. 13 is a schematic drawing showing program relationships for a "combine" operation of the linking program.

FIGS. 10–13 illustrate several exemplary connection configurations or modes which may be accommodated using the linking program. FIG. 10 shows a "Route" mode which merely routes information from one application to another. FIG. 11 shows a "Collect" mode for gathering information from several programs and collecting that information at a collecting program. FIG. 12 shows a "Broadcast" mode in which information from one application is broadcast to several other programs. FIG. 13 shows a "Combine" mode where several functions are combined between applications.

Figure 14:
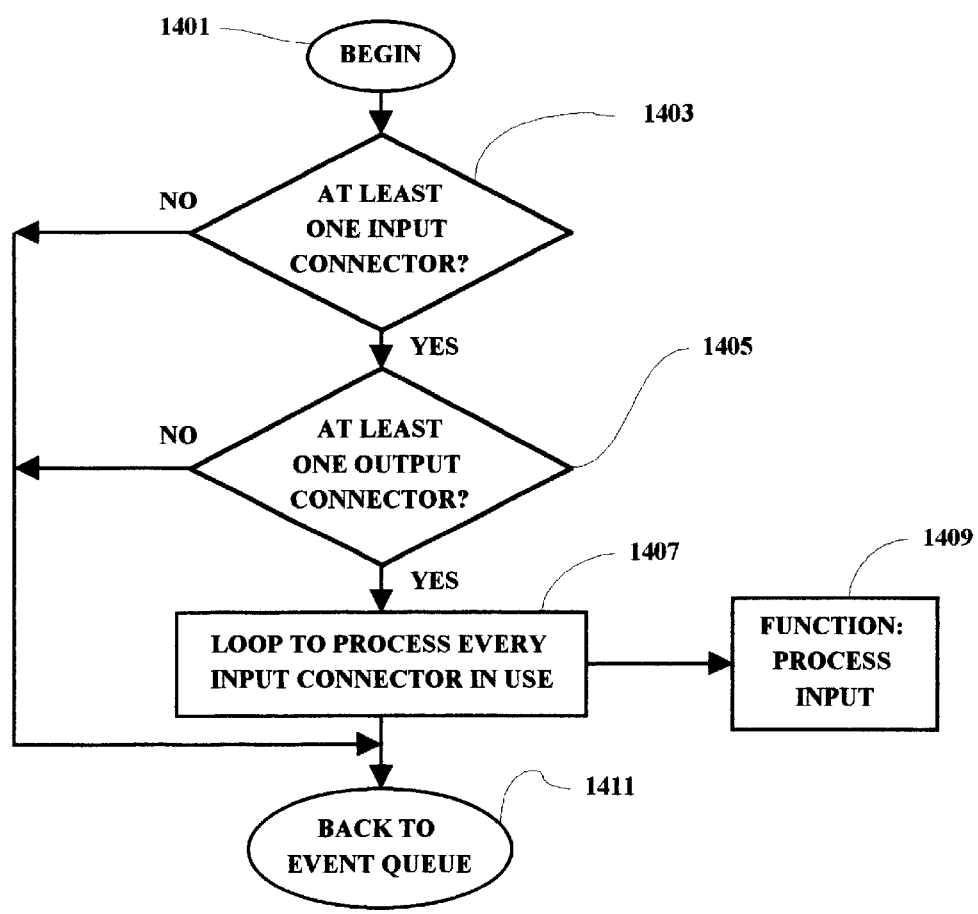
FIG. 14 is a flow chart illustrating an exemplary flow control for the linking program.

In FIG. 14, a basic flow chart is illustrated showing a high level linking program flow. As shown, when the program starts 1401 a check is made 1403 to determine whether there has been at least one input connector tied to an input field of a program. If not, the program is returned to an event queue 1411 to await further input. If at least one input connector has been established 1403 then a check is made to determine if at least one output connector has been tied to an output field by a user. If not, the program is returned to an event queue 1411. If there has been at least one output connector set 1405, then the program will loop to process every input connector in use 1407, perform designated functions 1409 and return to the event queue 1411.

Figure 15:
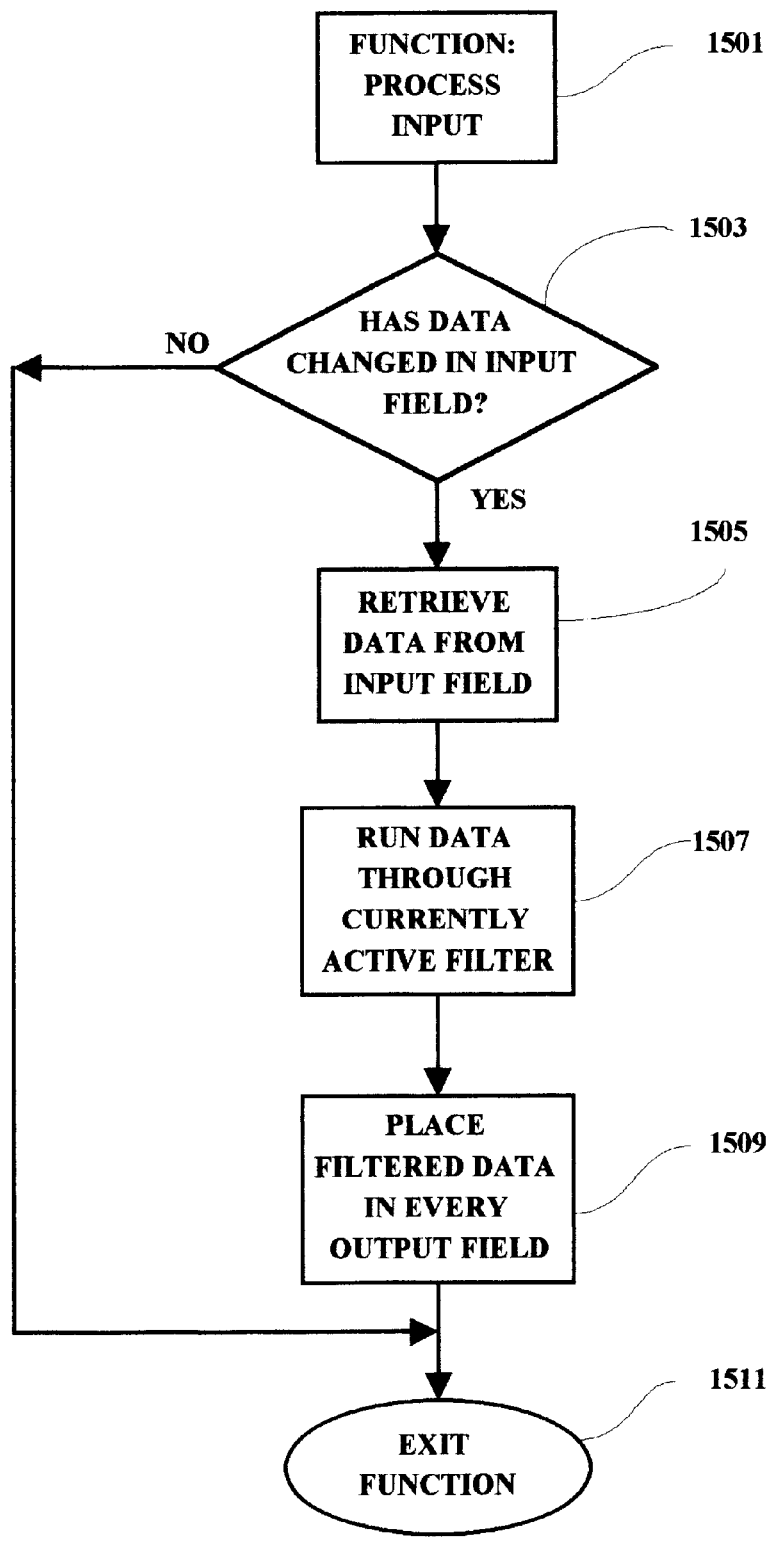
FIG. 15 is a flow chart illustrating an exemplary flow control for the input processing performed by the linking program.

The flow chart illustrated in FIG. 15 shows the steps accomplished in performing the selected function in the selected program configuration. As shown, when the function process begins 1501 a check is made to determine if there has been a data change in the selected input field 1503. If not the program exits the function 1511. If there has been a data change in the selected input field 1503, the data is retrieved from the input field 1505, and run through the currently active filter 1507. The filtered or filter processed data is then placed 1509 in every output field that has been designated by the user and the function is exited 1511.

Figure 16:
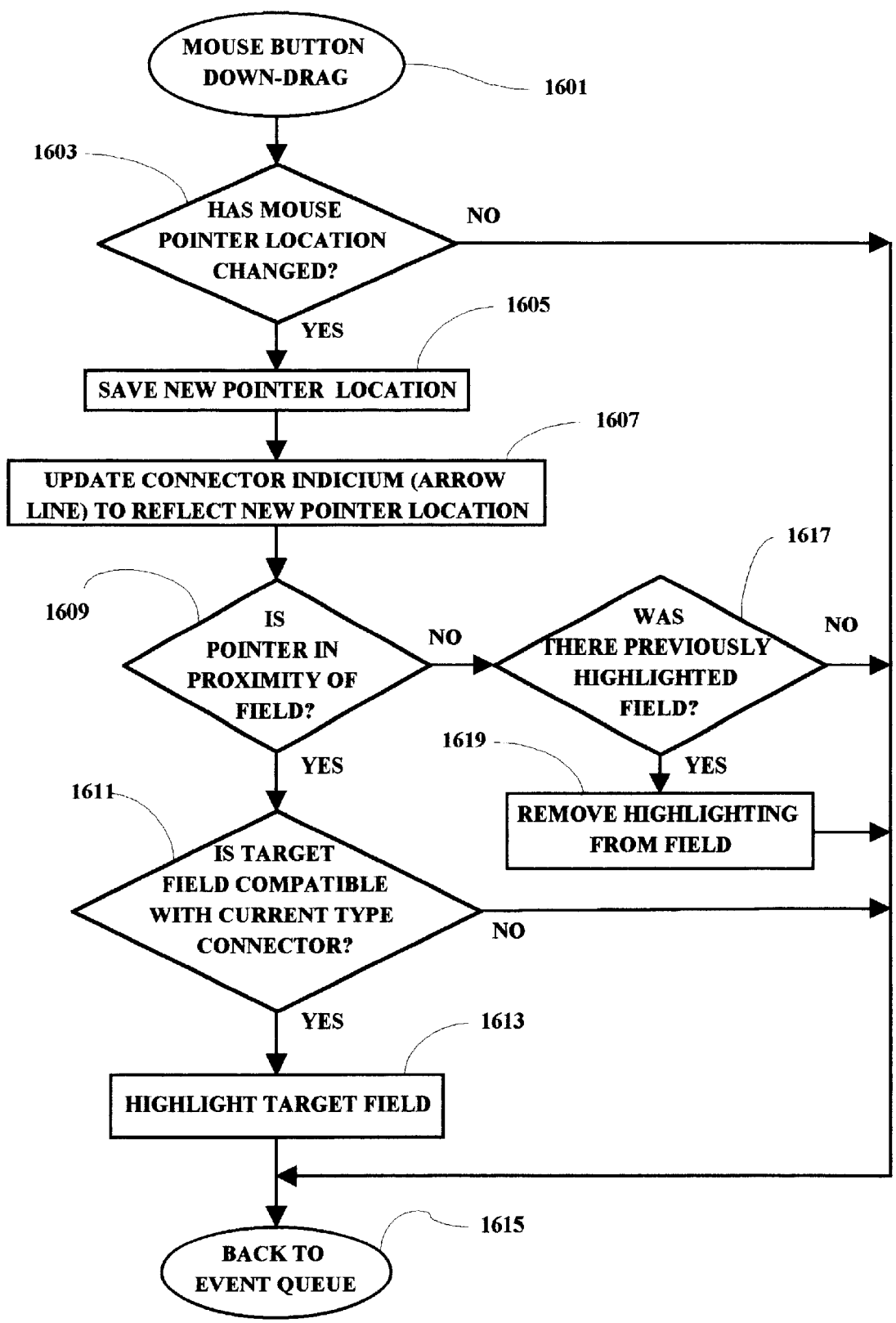
FIG. 16 is a flow chart illustrating an exemplary flow control for several of the mouse operations performed within the linking program.

In FIG. 16, an exemplary flow is illustrated for the placement of the connection arrows. When the mouse button is down and being dragged 1601, a check is made 1603 as to whether or not the pointer position has changed. Until the pointer position changes, the program remains in the event queue 1615. When the pointer position changes 1603, the new pointer position is saved 1605 and the connector indicium or arrow line is updated 1607 to reflect the new pointer position. A check is then made to determine if the pointer is in the proximity of a field 1609 within one of the programs being run. If not, a check is made to determine if there was a previously highlighted field 1617. If so, the field highlighting is removed 1619 and the program is returned to the event queue 1615. If there was no previously highlighted field 1617 the program is returned directly to the event queue 1615. If the pointer is in the proximity of a target field 1609, a check is made to determine if the target field is compatible 1611 with the current type connector being placed by the user. If not, the program returns to the event queue 1615. If the currently selected field is compatible with the connector being placed 1611, the target field is highlighted 1613 and the program returns to the event queue 1615.

Figure 17:
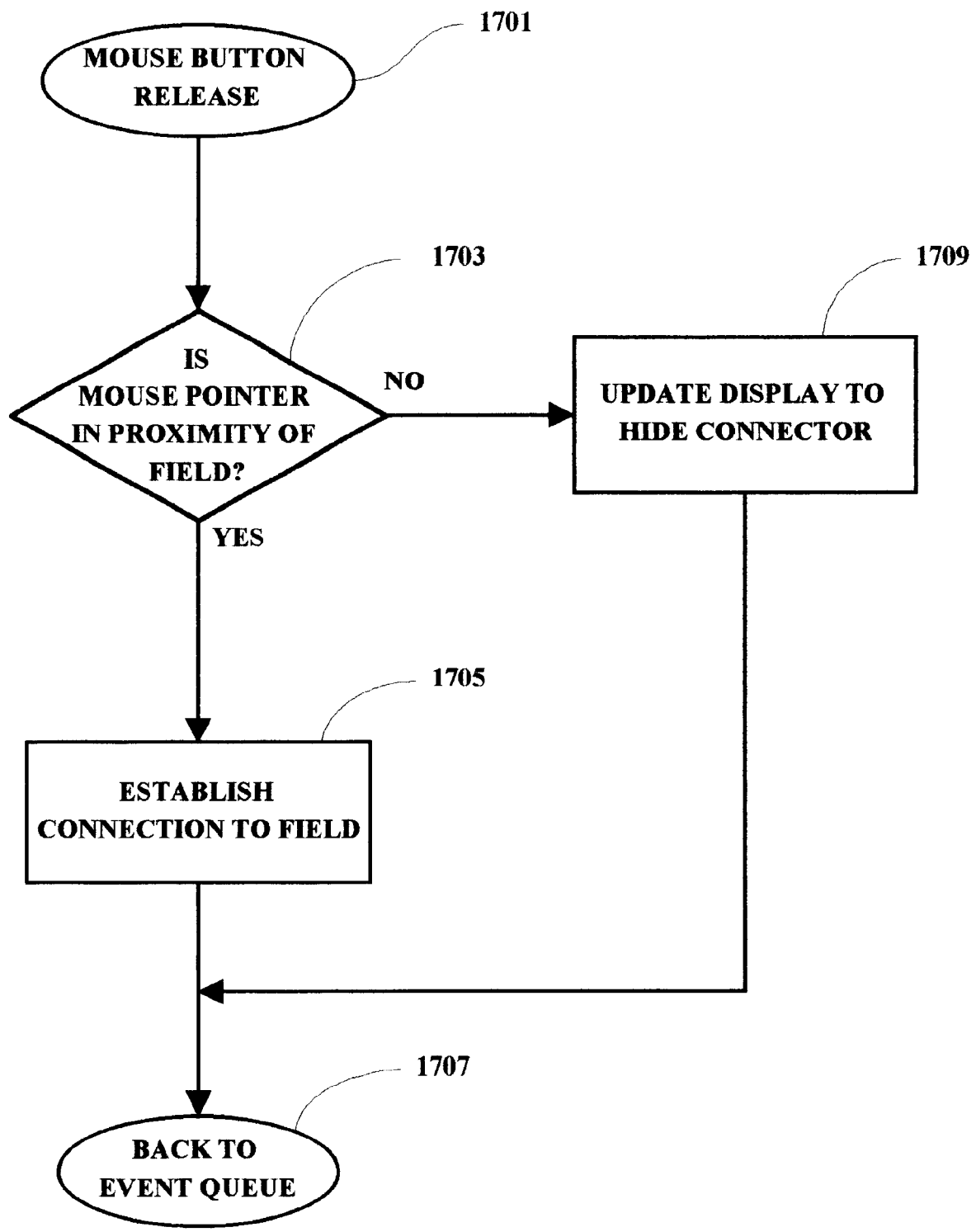
FIG. 17 is a flow chart illustrating an exemplary flow control for additional mouse operations of the linking program.

In FIG. 17, an exemplary flow for the establishment of the connector or connection arrow is illustrated. As shown, When the mouse button is release from dragging an arrow connector 1701, a check is made to determine if the mouse pointer is in the vicinity of a field 1703. If so the connection to the field is established 1705 and the program is returned to the event queue 1707. If the pointer was not in the vicinity of a field when the mouse button was released 1703, then the display is updated to hide the connector 1709 and the program returns to the event queue 1707.

The method and apparatus of the present invention has been described in connection with an exemplary embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code stored on a CD, disk or diskette (portable or fixed), or other memory device, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing input information received from at least a first computer program and outputting said processed information, said method comprising:

providing at least a first program image on a display device at a user terminal, said first program image being representative of said first computer program;

providing a processing program image on said display device, said processing program image being representative of a processing program, said processing program being independent from said first computer program;

receiving input information by said processing program from said first computer program;

selecting at least one of a plurality of available processing functions which may be performed by said processing program to provide a processed output; and continuously performing said selected processing function on input information as said input information is input to said first computer program by a user at said user terminal for providing said processed output.

2. The method as set forth in claim 1 and further including:

providing an output window on said display device, said output window being associated with said processing program; and displaying said processed output within said output window.

3. The method as set forth in claim 1 and further including:

providing a second program image on said display device at said user terminal, said second program image being representative of a second computer program; and receiving said processed output by said second computer program.

4. The method as set forth in claim 3 and further including:

providing a plurality of program images on said display device at said user terminal, said plurality of program images being representative of a corresponding plurality of computer programs, said processing program being selectively operable for outputting said processed output to a number of said computer programs as may be selected by said user.

5. The method as set forth in claim 3 wherein said processing program image includes an input receiving screen area and an output providing screen area, said method further including:

visually coupling said input receiving screen area to a selected field in said first program image to visually indicate that said selected field of said first program image is coupled to said processing program input receiving screen area and information from said first computer program is provided as input to said processing program; and visually coupling said output providing screen area to a selected field of said second program image to visually indicate that said processing program image is coupled to said second program image and information from said processing program is provided as output to said selected field of said second computer program.

6. The method as set forth in claim 3 wherein said user terminal is connected in a network, and at least one of said first and second computer programs are accessed by said user terminal from a network site remote from said user terminal.

7. The method as set forth in claim 3 wherein said processing program image includes a process selection indicium, said method further including:

presenting a listing of said plurality of available processing functions in response to a user activation of said process selection indicium; and making said selection of said processing functions from said listing.

8. The method as set forth in claim 7 wherein said available processing functions include a copying function selectively operable for copying selected content from said first computer program, and providing said copied content to said second computer program.

9. The method as set forth in claim 8 wherein results from said copying function are displayed on said display device in said second program image.

10. The method as set forth in claim 7 wherein said available processing functions include a conversion function selectively operable for converting selected content from said first computer program from one form to another, and providing said converted content to said second computer program.

11. The method as set forth in claim 7 wherein said available processing functions include a trigger function selectively operable for automatically triggering a predetermined action upon detecting a predetermined content from said input information.

12. The method as set forth in claim 1 wherein said input information from said first computer program is received from an input field selected by a user, said method further including:

visually marking said input field in said first program image to be visually distinctive from other fields in said first program image.

13. The method as set forth in claim 3 wherein said input information from said first computer program is received from an input field selected by a user, said method further including:

visually marking said input field in said first program image to be visually distinct from other fields in said first program image.

14. The method as set forth in claim 13 wherein said processed output is provided to a selected output field of said second program image, said method further including:

visually marking said output field in said second program image to be visually distinct from other fields in said second program image.

15. The method as set forth in claim 1 and further including:

providing a plurality of program images on said display device at said user terminal, said plurality of program images being representative of a corresponding plurality of computer programs, said processing program being selectively operable for receiving inputs from a number of said computer programs as may be selected by said user.

16. The method as set forth in claim 1 wherein said processing program image includes an input receiving screen area, said method further including:

visually coupling said input receiving screen area to a selected field in said first program image to visually indicate that said selected field of said first program image is coupled to said processing program input receiving screen area and information from said first computer program is provided as input to said processing program.

17. The method as set forth in claim 16 wherein said processing program image includes an output providing screen area, said method further including:

visually coupling said output providing screen area to said output window to visually indicate that said processing program image is coupled to said output window and information from said processing program is provided as output to said output window.

18. The method as set forth in claim 1 wherein said user terminal is connected in a network, and said first computer program being accessed by said user terminal from a network site remote from said user terminal.

19. The method as set forth in claim 1 wherein said processing program image includes a process selection indicium, said method further including:

presenting a listing of said plurality of available processing functions in response to a user activation of said process selection indicium; and making said selection of said processing functions from said listing.

20. The method as set forth in claim 19 wherein said available processing functions include a searching function selectively operable for searching said input information for items designated by said user; and displaying results from said searching function on said display device.

21. The method as set forth in claim 19 wherein said available processing functions include a counting function selectively operable for counting selected items occurring in said input information; and displaying results from said counting function on said display device.

22. The method as set forth in claim 1 wherein said processing program is selectively operable on a continuing basis, said processing program image further including a toggle indicium, said toggle indicium being selectively actuated by said user for toggling said processing program between an "on" state in which input information is being processed and provided as said processed output, and an "off" state in which said input information is not being processed by said processing program.

23. The method as set forth in claim 1 wherein said first computer program is a messenger program operable for displaying content input from said user at said user terminal and also communicating and displaying said content input from said user to a second terminal remote from said user terminal.

24. A storage medium including machine readable coded indicia, said storage medium being selectively coupled to a reading device, said reading device being selectively coupled to a computer system, said reading device being selectively operable to read said machine readable coded indicia and provide program signals representative thereof, said program signals being effective to enable a processing of selected input information received from at least a first computer program and outputting said processed information to a selected output display, said program signals being selectively operable to accomplish the steps of:

providing a processing program image on said display device, said processing program image being representative of a processing program, said processing program being independent from said first computer program;

receiving input information by said processing program from said first computer program;

enabling a user selection of at least one of a plurality of available processing functions which may be performed by said processing program to provide a processed output; and continuously performing said selected processing function on input information as said input information is input to said first computer program by a user at a user terminal to provide a processed output to said selected output display.

25. A computer system comprising:

a signal bus for transferring signals between various components of said computer system;

a central processing means coupled to said signal bus;

a user input means coupled to said signal bus, said user input means being arranged for receiving user input;

memory means coupled to said signal bus, said memory means being arranged for storing information; and a display device coupled to said signal bus, said computer system being selectively operable in response to a processing program and user input for providing a processing program image on said display device, said processing program image being representative of said processing program, said processing program being operable for receiving input information from a first computer program running on said computer system, and displaying, for a user selection, at least one of a plurality of available processing functions which may be performed by said processing program on said input information, said computer system being further operable for continuously performing a selected processing function on said input information as said input information is input to said first computer program by a user at said user input means to provide a processed output to a selected output display area on said display device.

* * * * *